United States Patent
Li et al.

(10) Patent No.: US 10,547,638 B1
(45) Date of Patent: Jan. 28, 2020

(54) DETECTING NAME RESOLUTION SPOOFING

(71) Applicant: CA, Inc., San Jose, CA (US)

(72) Inventors: Feng Li, Richmond Hill (CA); Adam Glick, Culver City, CA (US); Akshata Krishnamoorthy Rao, Mountain View, CA (US); Douglas Schlatter, Playa Vista, CA (US)

(73) Assignee: CA, Inc., San Jose, CA (US)

( * ) Notice: Subject to any disclaimer, the term of this patent is extended or adjusted under 35 U.S.C. 154(b) by 127 days.

(21) Appl. No.: 15/466,383

(22) Filed: Mar. 22, 2017

(51) Int. Cl.
*H04L 29/06* (2006.01)
*H04L 29/12* (2006.01)

(52) U.S. Cl.
CPC ...... *H04L 63/1483* (2013.01); *H04L 61/1511* (2013.01); *H04L 63/1425* (2013.01); *H04L 61/6059* (2013.01); *H04L 61/6063* (2013.01)

(58) Field of Classification Search
None
See application file for complete search history.

(56) References Cited

U.S. PATENT DOCUMENTS

| | | | | |
|---|---|---|---|---|
| 5,729,689 A | * | 3/1998 | Allard | H04L 29/12132 707/999.01 |
| 7,849,502 B1 | * | 12/2010 | Bloch | H04L 29/12066 726/11 |
| 9,923,961 B2 | * | 3/2018 | Hentunen | H04L 67/1036 |
| 2006/0248082 A1 | * | 11/2006 | Raikar | H04L 9/32 |
| 2008/0147837 A1 | * | 6/2008 | Klein | H04L 29/12066 709/223 |
| 2008/0313181 A1 | * | 12/2008 | Leung | G06F 16/951 |
| 2009/0006861 A1 | * | 1/2009 | Bemmel | G06F 21/31 713/189 |
| 2010/0031022 A1 | * | 2/2010 | Kramer | G06F 21/6218 713/155 |
| 2018/0020002 A1 | * | 1/2018 | Duca | H04L 63/101 |

OTHER PUBLICATIONS https://www.nccgroup.trust/globalassets/resources/uk/premium-downloads/whitepapers/local-networkcompromise-despite-good-patchingpdf; 2017, NCC Group.
http://www.pciqsatalk.com/2016/03/disable-lmnr-netbios.html; 2016, Stewart Fey.
https://blog.netspi.com/identifying-rogue-nbns-spoofers/; Sep. 5, 2013, Karl Fosaaen.

* cited by examiner

*Primary Examiner* — Benjamin E Lanier
(74) *Attorney, Agent, or Firm* — Maschoff Brennan (57) ABSTRACT

A method for detecting name resolution spoofing is described. In one embodiment, the method includes identifying a request to resolve a host name, identifying a hostname specified in a response to the request, identifying an actual hostname associated with the response, analyzing the hostname specified in relation to the actual hostname, and performing a security action based at least in part on the analysis.

20 Claims, 7 Drawing Sheets

DETECTING NAME RESOLUTION SPOOFING

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for detecting name resolution spoofing is described. In one embodiment, the method may include identifying a request to resolve a host name, identifying a hostname specified in a response to the request, identifying an actual hostname associated with the response, analyzing the hostname specified in relation to the actual hostname, and performing a security action based at least in part on the analysis. In some cases, the computer network includes a subnetwork of a local area network.

In some embodiments, identifying the request to resolve the host name may include monitoring communications associated with a hostname resolution protocol. In some cases, a requesting device broadcasts the request over a computer network. In some examples, a responding device sends the response to the requesting device over the computer network. In some cases, the hostname resolution protocol includes at least one of a Link-Local Multicast Name Resolution (LLMNR) protocol and a Netbios Name Service (NBNS) protocol.

In some embodiments, the method may include monitoring processes on at least one of the responding device, the requesting device, and a third device associated with the computer network, or any combination thereof, to detect a first process using a second process to send the response.

In some embodiments, the method may include analyzing the hostname specified and the actual hostname in relation to a whitelist. In some cases, the whitelist includes a list of at least one process, at least one device, or any combination thereof permitted to specify in the response a non-matching hostname that differs from the actual hostname. In some examples, the whitelist includes file information associated with at least one process or device included in the whitelist, the file information including at least one of a file name, file size, file content, file path, file hash, signing information of a digitally signed file, or any combination thereof. In some embodiments, the whitelist includes the non-matching hostname that differs from the actual hostname.

In one embodiment, the security action includes at least one of monitoring the responding device, blocking a message from the responding device, performing a malware scan on a process associated with the response, performing a malware scan on the responding device, quarantining the process associated with the response, disconnecting the responding device from the computer network, blocking the responding device from accessing the computer network, or any combination thereof.

In one embodiment, the security action includes at least one of generating a notification that includes at least one or any combination of an indication of a potential spoofed broadcast name query response, information retrieved from the response, information from the responding device, information from a result of the analysis, and sending the notification to a designated recipient.

A computing device configured for detecting name resolution spoofing is also described. The computing device may include one or more processors and memory in electronic communication with the one or more processors. The memory may store computer executable instructions that when executed by the one or more processors cause the one or more processors to perform the steps of identifying a request to resolve a host name, identifying a hostname specified in a response to the request, identifying an actual hostname associated with the response, analyzing the hostname specified in relation to the actual hostname, and performing a security action based at least in part on the analysis. In some cases, the computer network includes a subnetwork of a local area network.

A non-transitory computer-readable storage medium storing computer executable instructions is also described. When the instructions are executed by a processor, the execution of the instructions may cause the processor to perform the steps of identifying a request to resolve a host name, identifying a hostname specified in a response to the request, identifying an actual hostname associated with the response, analyzing the hostname specified in relation to the actual hostname, and performing a security action based at least in part on the analysis. In some cases, the computer network includes a subnetwork of a local area network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting name resolution spoofing. More specifically, the systems and methods described herein relate to detecting name resolution spoofing in relation to one or more devices associated with a computer network.

Link-Local Multicast Name Resolution (LLMNR) and Netbios Name Service (NBNS) are protocols for resolving a hostname such as translating a human-readable computer name to an Internet Protocol (IP) address. As one example, LLMNR and/or NBNS may be used to resolve a hostname when the DNS query fails for a given computer system. The LLMNR protocol is based on the Domain Name System (DNS) packet format that allows both IP version 4 (IPv4) and IPv6 hosts to perform name resolution for hosts on the same local link. Both protocols may be based on user datagram protocol (UDP) broadcasting on the subnet. LLMNR may be considered a successor to NBNS. Unlike NBNS, LLMNR is able to handle IPv6.

The practice of dividing a network into two or more networks is called subnetting. Computers that belong to a subnet are addressed with a common, identical, most-significant bit-group in their IP address. This results in the logical division of an IP address into two fields, a network or routing prefix and the "rest" field or host identifier. The rest field is an identifier for a specific host or network interface. On TCP/IP networks, subnets are defined as all devices whose IP addresses have the same prefix. For example, all devices with IP addresses that start with 100.100.100.xx would be part of the same subnet. Dividing a network into subnets is useful for both security and performance reasons. IP networks are divided using a subnet mask. Typically, a subnet may represent all the machines at one geographic location, in one building, or on the same local area network (LAN). Having an organization's network divided into subnets allows it to be connected to the Internet with a single shared network address. Without subnets, an organization may get multiple connections to the Internet, one for each of its physically separate subnetworks, but this may result in an unnecessary use of the limited number of network numbers the Internet has to assign. It may also result in Internet routing tables on gateways outside the organization having to monitor and manage routing that may preferably be handled within an organization.

In NetBIOS, each participant may register on the network using a unique name of at most 15 characters. In legacy networks, when a new application wanted to register a name, it broadcasted a message asking whether anyone was currently using that name and then waited for an answer. If an answer was not returned, the application assumed that the name was not in use. However, though the wait timeout was only a few seconds, such a time period is a relatively long time period in computer timing making the name registration a relatively time consuming process, as the only way of knowing that a name was not registered was to wait until the time period expired with a reply.

NBT may implement a central repository, or Name Service, that records all name registrations. An application configured to register a name would therefore contact the name server, which has a known network address, and ask whether the name is already registered, using a "Name Query" packet. This configuration is faster, as the name server returns a negative response immediately if the name is not already in the database, meaning it is available. In some cases, the Name Service may be referred to as a NetBIOS Naming Service (NBNS). To some extent, the packet formats of the Name Service may coincide with the formats of DNS. However, unlike DNS, NBNS may include a NetBIOS "Node Status" query, dynamic registration, and conflict marking packets. Packets of NBNS may be encapsulated in UDP. To start a session or to send a datagram to a particular host rather than to broadcast the datagram, NBT determines the IP address of the host with a given NetBIOS name. This may be done by broadcasting a "Name Query" packet, and/or sending it to the NetBIOS name server. The response will have the IP address of the host with that name.

A typical attack scenario may include machine-A broadcasting an LLMNR request to resolve computer name "computer1" on the subnet. Under some circumstances, no machine will answer the request. These circumstances may include certain scenarios such as: (a) "computer1" is misspelled as a non-existing machine like "computer1"; (b) "computer1" is off line; (c) "computer1" is unable to respond such as when it is under attack in a denial of service (DoS) attack. Meanwhile, "computer2" may be a compromised machine on the same subnet. As one example, malware on "computer2" may masquerade "computer2" as "computer1" by responding to the LLMNR query using the IP address of "computer2." After machine-A receives the spoofed response from the hacked "computer2," machine-A may begin a session with "computer2." The session may enable "computer2" to have access to information sent by machine-A. The information may be data, such as NT local area network manager (NTLM) hashes and the like. NTLM may include a suite of security protocols that provides authentication, integrity, and confidentiality to interconnected machines such as machine-A and users of such machines.

A vulnerability of LLMNR/NBNS is that the protocols do not authenticate if the response is genuine. The present systems and methods may be configured to validate the hostname specified in a LLMNR/NBNS response with the responder's actual host name to detect spoofing attacks. The present systems and methods may include a monitoring component that monitors all LLMNR/NBNS responses from the host machine. Such a component may be integrated with an endpoint security solution.

An LLMNR/NBNS response contains one or more answer records, consisting of the computer name, IP address and other information. If the computer name specified in the answer record is not consistent with the computer name that is retrieved from the host, this may indicate a spoofed broadcast name query response by an attacker. In such a case, the present systems and methods may generate an alert. As one example, the present systems and methods may generate a notification and send the notification indicating a potential LLMNR/NBNS attack. The monitoring system of the present systems and methods may also block the suspicious response.

As a malware process may be configured to avoid detection by injecting into other processes and performing its actions indirectly, the monitoring system may be configured to watch the LLMNR/NBNS responses from a system level, enabling the present systems and methods to cover all processes.

In some cases, a whitelisting component may list which processes are legitimate to send LLMNR/NBNS responses with different machine names and special names that the host can respond with even it is different from the machine's host name. In the case where a legitimate process includes a feature to fake a LLMNR/NBNS response, the corresponding files of the legitimate process may be added to a whitelist to avoid false positive detection. The file information may include any information that identifies a file such as file name, file size, file content, file path, file hash, signing information, or any combination thereof. In the case where a host has a legitimate reason to respond to certain name queries with a different name than its own hostname, the different name may be added to the whitelist.

In some cases, the present systems and methods may include an alerting component. The alerting component may notify the incident responder of the spoofed response and provide information about the instance. For example, the alerting component may generate a notification that includes information regarding a device that responds to the name query, the name of a process that responds to the name query, the data content of a response, etc. In some cases, the content of a response may enable an incident responder to understand what other machines on the affected computer network may be affected by the same attack.

Conventional solutions included disabling LLMNR/NBNS protocols to prevent such spoofing attacks. However, although disabling LLMNR/NBNS is a foolproof solution to such an attack, it is not convenient for customers when DNS is not available. It may lead to more name query failures. Thus, the present systems and methods provide a detection system that does not result in the loss of the benefits from LLMNR/NBNS protocols.

Another conventional solution makes frequent NBNS requests for a non-existent host name and listens for a response. Since there shouldn't be any responses for this host name, the listener sit idle until a response is received. If a response is received, it indicates a spoofer on the network. However, there are two issues with this method. First, if the attacker is able to recognize a honeypot scheme and only responds to legitimate host name queries when the hosts are not available, the strategy doesn't work. Second, this method generates unnecessary network traffic. Conversely, neither issue exists with the present systems and methods, as the present systems and methods do not result in additional traffic and the present systems and methods validate the name query response on the endpoint in every case.

Figure 1:
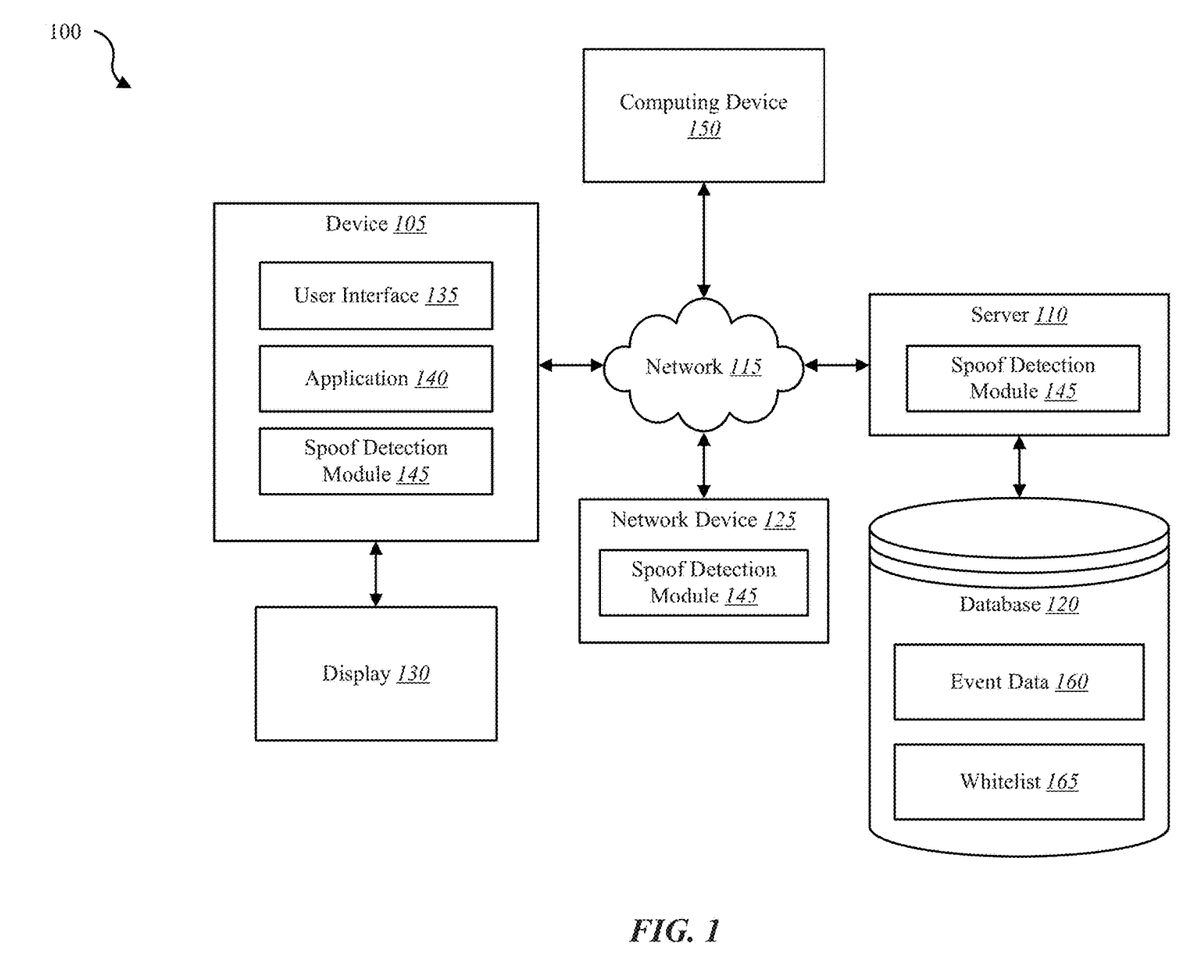
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a network device 125, a display 130, a computing device 150, and a network 115 that allows the device 105, the server 110, the computing device 150, and network device 125 to communicate with one another.

Examples of the device 105 may include any combination of network devices, mobile computing devices, smart phones, personal computing devices, computers, laptops, desktops, servers, client machine devices, or any combination thereof.

Examples of computing device 150 may include any combination of a network device, mobile computing device, a laptop, a desktop, a server, a media set top box, or any combination thereof. Computing device 150 may be part of a same network as device 105 and/or server 110 in some cases. Alternatively, computing device 150 may be a computer external to a network associated with device 105 and/or server 110.

Examples of server 110 may include any combination of a data server, a cloud server, proxy server, mail server, web server, application server, database server, communications server, file server, home server, mobile server, name server, or any combination thereof.

In some cases, network device 125 may include network device hardware, network device software, network device firmware, or any combination thereof by which the present systems and methods may be implemented. As one example, network device 125 may include network equipment, computer networking devices, or any combination thereof. Network device 125 may include any combination of physical devices configured for data communication and interaction between devices on a computer network. Examples of network device 125 and/or any other network device associated with the present systems and methods may include at least one of an intrusion prevention system (IPS), intrusion detection system (IDS), a network router, a wired router, a wireless router, network interface controller, wireless network interface controller, a modem, network bridge, network hub, network switch, a multilayer switch, a gateway, a bridge router, a multiplexor, a repeater, a firewall, a proxy server, or any combination thereof.

In some configurations, the device 105 may include a user interface 135, application 140, and spoof detection module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, spoof detection module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a spoof detection module 145. For example, device 105 may include application 140 that allows device 105 to interface back and forth with an external device via spoof detection module 145 located on another device such as computing device 150, network device 125, and/or server 110. In some embodiments, device 105, network device 125, and server 110 may include a spoof detection module 145 where at least a portion of the functions of spoof detection module 145 are performed separately and/or concurrently on device 105, network device 125, and/or server 110. Likewise, in some embodiments, a user may access the functions of device 105 and/or network device 125 (directly or through device 105 via spoof detection module 145) from computing device 150. For example, in some embodiments, computing device 150 includes a mobile application that interfaces with one or more functions of device 105, network device 125, spoof detection module 145, and/or server 110.

In some embodiments, server 110 may be coupled to database 120 as depicted. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly to computing 150 and/or or network device 125. In one embodiment, database 120 may include event data 160 and whitelist 165. As one example, device 105 may access event data 160 and/or whitelist 165 in database 120 over network 115 via server 110.

In one embodiment event data 160 may include data regarding events detected in relation to device 105, server 110, network device 125, and/or computing device 150. In some cases, event data 160 may include events associated with hostname resolution requests. For example, event data 160 may include data associated with a request to resolve a hostname that is broadcasted over network 115, a device that sends the request, a response to the request transmitted over network 115, a device that sends the request, or any combination thereof. In some cases, whitelist 165 may include data related to a whitelist of hostnames, processes, devices, or any combination thereof. For example, whitelist may include a device that is permitted to specify a hostname that does not match the actual hostname of the device. In some embodiments, spoof detection module 145 may be configured to perform the systems and methods described herein in conjunction with user interface 135 and application 140. User interface 135 may enable a user to interact with, control, and/or program one or more functions of spoof detection module 145. Further details regarding the spoof detection module 145 are discussed below.

Figure 2:
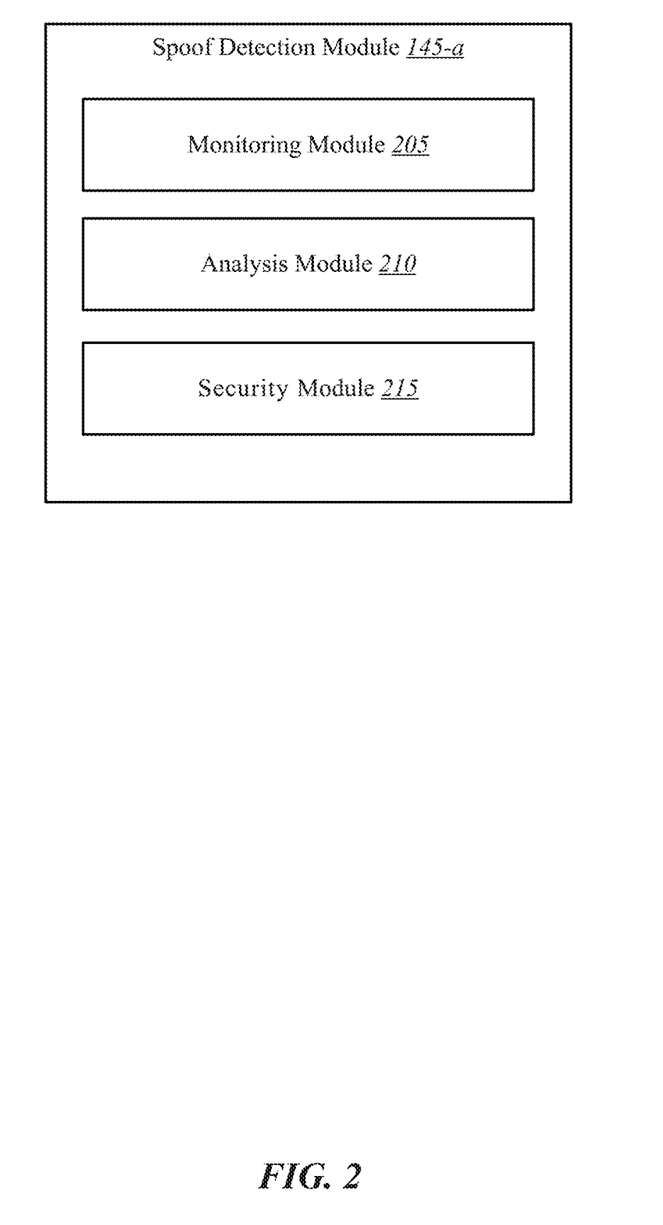
FIG. 2 is a block diagram illustrating one example of one or more modules in accordance with various aspects of this disclosure.

FIG. 2 is a block diagram illustrating one example of a spoof detection module 145-a. Spoof detection module 145-a may be one example of spoof detection module 145 depicted in FIG. 1. As depicted, spoof detection module 145-a may include monitoring module 205, analysis module 210, and security module 215.

In one embodiment, monitoring module 205 may be configured to identify a request to resolve a computer name, host name, or hostname. In some embodiments, monitoring module 205 may be configured to identify a hostname specified in a response to the request. In some cases, monitoring module 205 identifying the request to resolve the hostname may include monitoring module 205 monitoring communications associated with a hostname resolution protocol. In some cases, the hostname resolution protocol may include at least one of a Link-Local Multicast Name Resolution (LLMNR) protocol and a Netbios Name Service (NBNS) protocol. In some examples, a requesting device may broadcast the request over a computer network. In some cases, a request to resolve a hostname may be referred to as a broadcast hostname query. In some embodiments, a responding device may send the response to the requesting device over a computer network. For instance, the responding device may send a response to the request over the same computer network the request is broadcasted.

In some examples, the computer network may include a subnetwork of a local area network. In some cases, the requesting device and responding device may be on the same subnetwork of a local area network. For example, the requesting and responding devices may be on the same subnetwork of an enterprise network such as computing devices on a computer network of a company or organization.

In some embodiments, monitoring module 205 may be configured to identify an actual hostname associated with the response. As one example, a response may include one or more answer records. In some cases, an answer record may include at least one of a hostname of the responding device (e.g., a specified or spoofed hostname, the actual hostname, etc.), an internet protocol (IP) address such as a source IP address of the responding device, a media access control (MAC) address of the responding device, other identifying information of the responding device, or any combination thereof.

In some embodiments, monitoring module 205 may be configured to monitor system level processes related to a broadcast hostname query. As one example, monitoring module 205 may be configured to monitor a process associated with a device responding to the broadcast hostname query. Additionally or alternatively, monitoring module 205 may be configured to monitor a process associated with a device making the broadcast hostname query, a device responding to the broadcast hostname query, a third device on the computer network different from the requesting device and responding device, a fourth device outside the computer network (e.g., a remote device with a remote connection to the computer network), or any combination thereof. In some cases, monitoring module 205 may be configured to monitor system level processes to detect a first process using a second process to send the response. As one example, the first process may include a malware process executing at least partially on the responding device and the second process may include a system process on the responding device hijacked by the first process. For instance, a remote computing device may hack the computer network and gain access to the responding device and execute a malware device on at least one of the remote computing device, the requesting device, and/or the responding device, or any combination thereof. In some cases, the malware process may use a legitimate process on the responding device such as a system process to respond to the request. Accordingly, monitoring module 205 may be configured to monitor system level processes to detect a malware process using a system process to send the response.

In some embodiments, analysis module 210 may be configured to analyze the hostname specified in relation to the actual hostname. As one example, the analysis module 210 determining the hostname specified in the answer record is not consistent with an actual hostname retrieved from the host may indicate a spoofed broadcast hostname query response by a malicious attacker.

In some embodiments, analysis module 210 may be configured to analyze the hostname specified and the actual hostname in relation to a whitelist. In some cases, the whitelist may include information regarding one or more processes permitted to specify a hostname that does not match an actual hostname of a responding device. For example, the whitelist may include a name of a process, a size of a process, software code of a process, a file path of a process, a hash of a process, signing information of a digitally signed process, or any combination thereof. Additionally or alternatively, the whitelist may include information regarding one or more devices permitted to specify a hostname that does not match an actual hostname of the respective device responding to a broadcasted hostname query. For example, a device with a hostname of "computer 1" may be added to the whitelist.

As one example, analysis module 210 may analyze a response that specifies the hostname "Foo-1234." In analyzing a response to a broadcasted hostname query, analysis module 210 may determine that "computer 1" specified a hostname of "Foo-1234" in the response. Upon determining hostname "computer 1" is in the whitelist, analysis module 210 may indicate to security module 215 that the response from the device with the hostname "computer 1" is permitted and does not merit a security response even though the hostname specified in the response does not match the actual hostname. In some cases, the whitelist may include the non-matching hostname that differs from the actual hostname. For example, the whitelist may include an entry for the hostname "Foo-1234." Thus, when "computer 1" specifies a hostname of "Foo-1234" in a response, analysis module 210 may determine that the response is permitted because the fake hostname "Foo-1234" is in the whitelist. In some embodiments, the whitelist may include file information associated with at least one process or device included in the whitelist, the file information including at least one of a file name, file size, file content, file path, file hash, signing information of a digitally signed file, or any combination thereof.

In one embodiment, security module 215 may be configured to perform a security action based at least in part on the analysis. In some embodiments, security module 215 may be configured to monitor a suspicious responding device in conjunction with the monitoring module 205. In some cases, security module 215 may be configured to block a message from the responding device, perform a malware scan on a process associated with the response, perform a malware scan in relation to the responding device, perform a malware scan in relation to the requesting device, or any combination thereof. Additionally or alternatively, security module 215 may be configured to quarantine a process of a device associated with the broadcast hostname query. As one example, security module 215 may be configured to quarantine a process of the responding device, a process of the requesting device, or any combination thereof. In some cases, security module 215 may be configured to quarantine the responding device, disconnect the responding device from a computer network, block the responding device from accessing the computer network, or any combination thereof. As one example, security module 215 may block the responding device from receiving an Internet Protocol (IP) address from the computer network. In some cases, security module 215 may block the responding device from receiving an IP address based at least in part on a MAC address of the responding device.

In some embodiments, security module 215 may be configured to generate a notification based at least in part on the results of analysis performed by analysis module 210. In one example, security module 215 may be configured to generate a notification that indicates a potential spoofed broadcast hostname query response is detected based at least in part on the analysis. Additionally, or alternatively, security module 215 may be configured to generate a notification that includes information retrieved from the response, information from the responding device, information from a result of the analysis, or any combination thereof. In some embodiments, security module 215 may be configured to send the notification to a designated recipient such as an administrator of the computer network. As one example, security module 215 may generate a notification that includes the name of a process that responds to a broadcasted hostname query. In some examples, the security module 215 may include in the notification data content from the response. In some cases, the content of a response may enable an incident responder to determine a potential attack is occurring and determine which machines may be affected by the potential attack.

Figure 3:
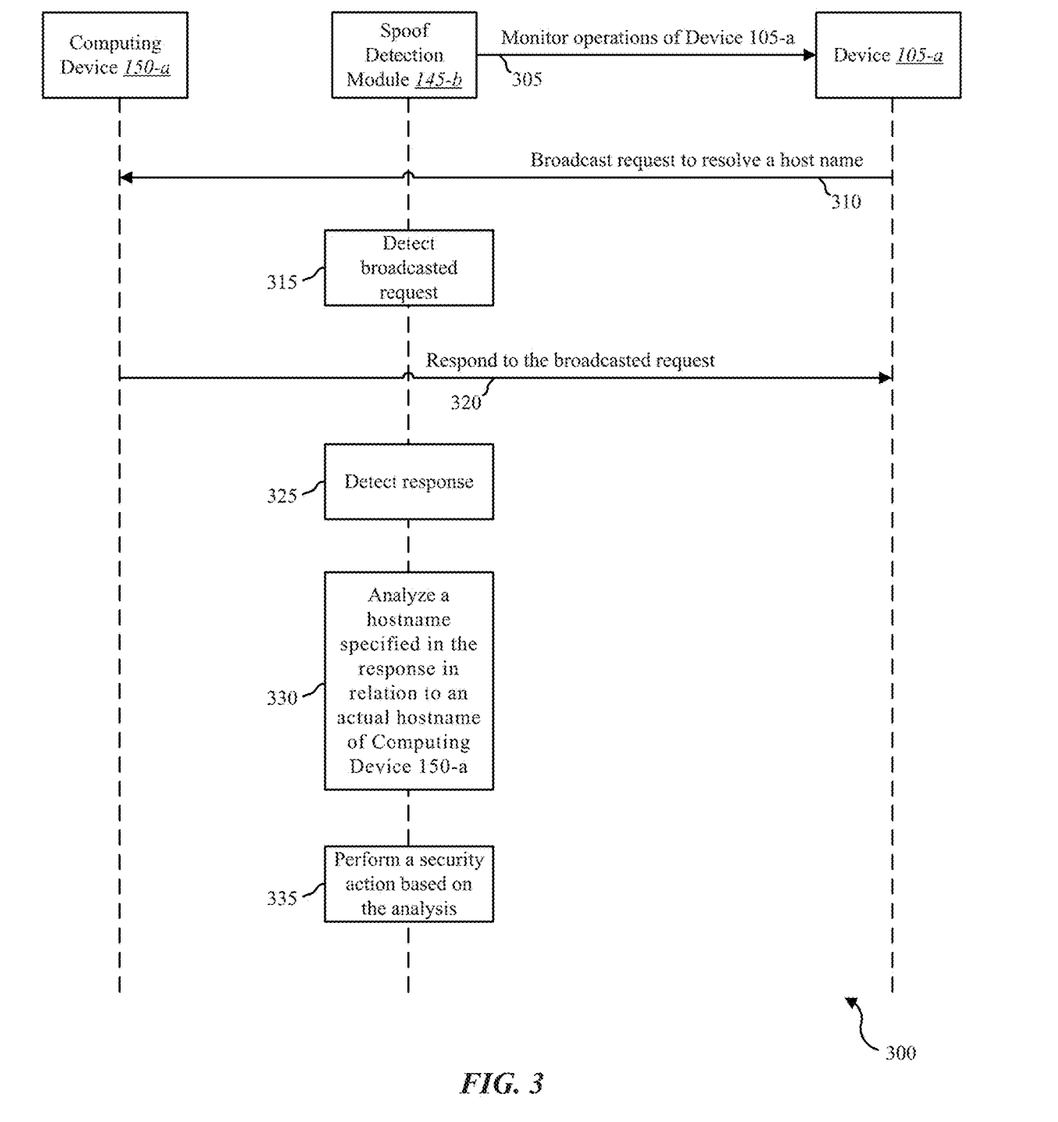
FIG. 3 shows a block diagram of a data flow in accordance with various aspects of this disclosure.

FIG. 3 shows a block diagram of a data flow 300 in accordance with various aspects of this disclosure. The data flow 300 illustrates the flow of data between spoof detection module 145-*b* and a device 105-*a*. The spoof detection module 145-*b* may be an example of spoof detection module 145-*b* from FIGS. 1 and/or 2. Device 105-*a* may be an example of device 105 and/or computing device 150 of FIG. 1. In some cases, spoof detection module 145-*b* may be installed on and perform one or more operations in relation to a computing device such as a smart phone, desktop, laptop, remote server (e.g., device 105, computing device 150, and/or server 110 of FIG. 1).

At 305, spoof detection module 145-*b* may monitor one or more operations of device 105-*a*. For example, spoof detection module 145-*b* may be configured to monitor operations of device 105-*a* related to requests to resolve a host name in relation to a hostname resolution protocol. In one embodiment, spoof detection module 145-*b* may be located on a network device of a computer network associated with device 105-*a*. Additionally, or alternatively, spoof detection module 145-*b* may be located on device 105-*a*. In some cases, spoof detection module 145-*b* may be located on a computing device connected to a computer network to which device 105-*a* is also connected such as in an intranet of a company or organization.

At 310, device 105-*a* may broadcast a request to resolve a host name. At block 315, spoof detection module 145-*b* may detect the request broadcasted by device 105-*a*. In some cases, at 320 computing device 150-*a* may respond request broadcast by device 105-*a*.

At block 325, spoof detection module 145-*b* may detect the response from computing device 150-*a*. At block 330, spoof detection module 145-*b* may analyze a hostname specified in the response in relation to an actual hostname of computing device 150-*a*. In one embodiment, the response from computing device 150-*a* may indicate a hostname that matches the actual hostname of computing device 150-*a*. In this case, spoof detection module 145-*b* may determine that the request is deemed legitimate and so may not perform a security action. Alternatively, upon determining that the specified hostname does not match the actual hostname of computing device 150-*a*, at block 335, spoof detection module 145-*b* may perform a security action.

Figure 4:
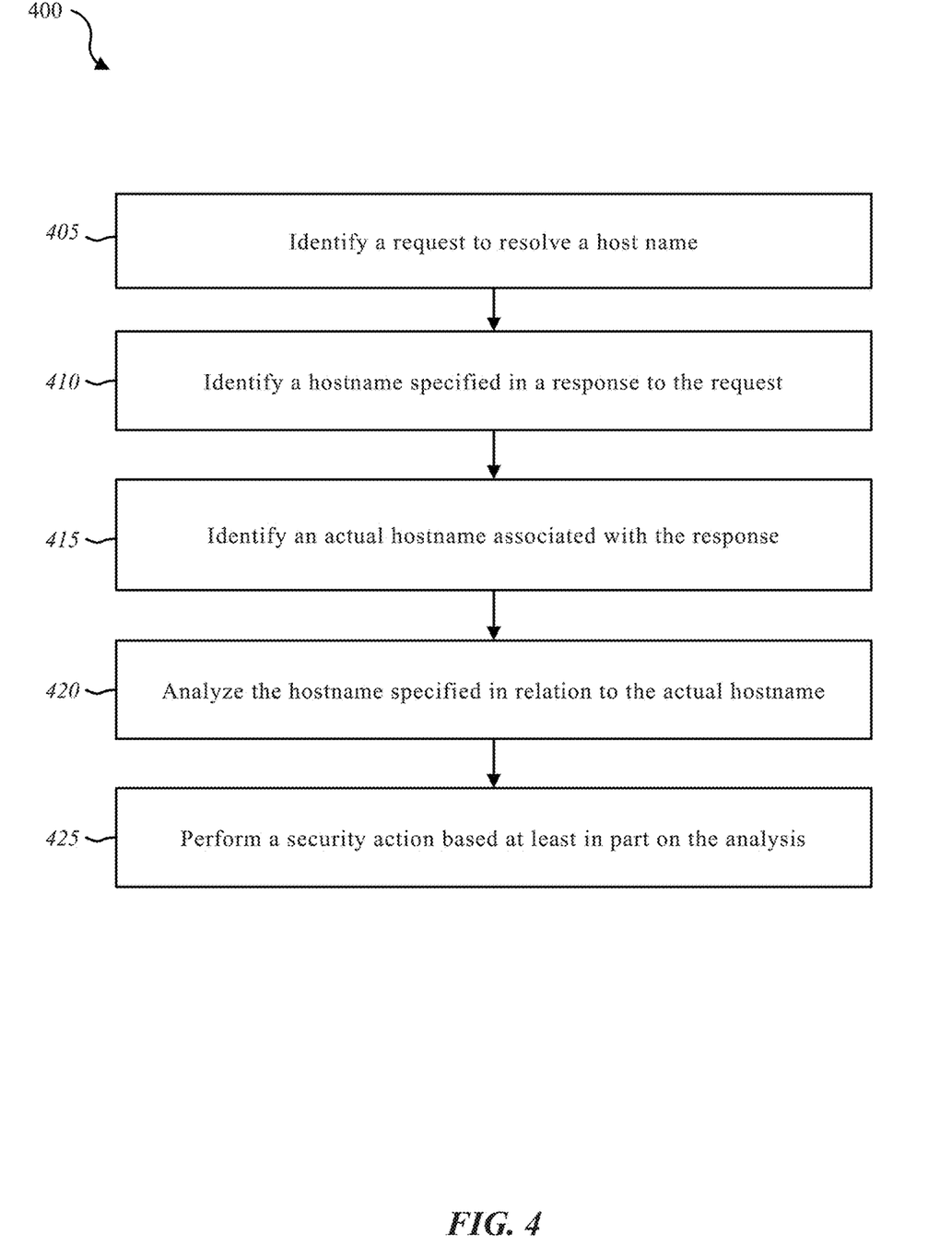
FIG. 4 is a flow diagram illustrating one embodiment of a method for detecting name resolution spoofing.

FIG. 4 is a flow diagram illustrating one embodiment of a method 400 for detecting name resolution spoofing. In some configurations, the method 400 may be implemented by the spoof detection module 145 illustrated in FIGS. 1, 2, and/or 3. In some configurations, the method 400 may be implemented in conjunction with device 105, server 110, network 115, network device 125, database 120, components thereof, or any combination thereof.

At block 405, method 400 may include identifying a request to resolve a host name. At block 410, method 400 may include identifying a hostname specified in a response to the request. At block 415, method 400 may include identifying an actual hostname associated with the response. At block 420, method 400 may include analyzing the hostname specified in relation to the actual hostname. At block 425, method 400 may include performing a security action based at least in part on the analysis.

Figure 5:
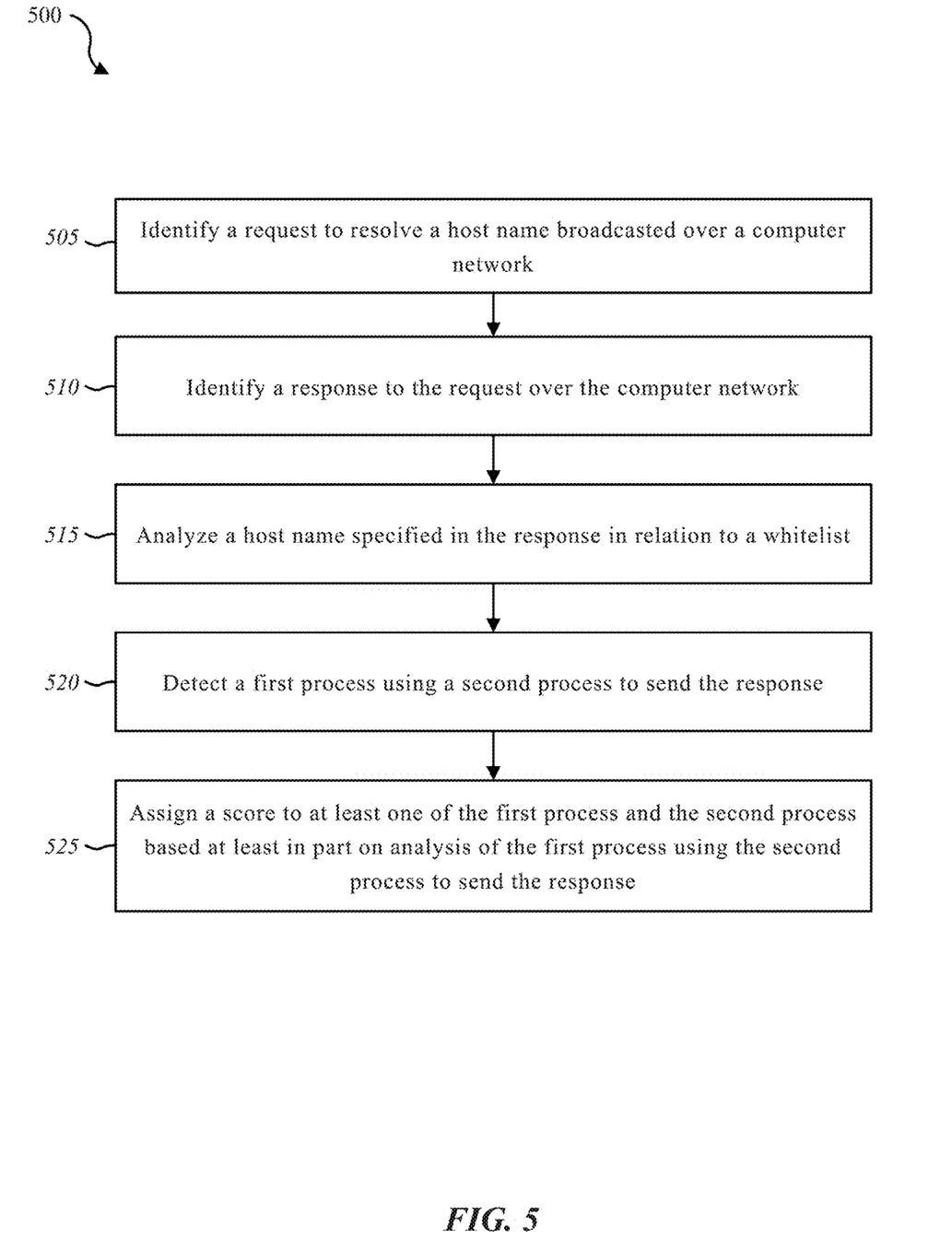
FIG. 5 is a flow diagram illustrating one embodiment of a method for detecting name resolution spoofing.

FIG. 5 is a flow diagram illustrating one embodiment of a method 500 for detecting name resolution spoofing. In some configurations, the method 500 may be implemented by the spoof detection module 145 illustrated in FIGS. 1, 2, and/or 3. In some configurations, the method 500 may be implemented in conjunction with device 105, server 110, network 115, network device 125, database 120, components thereof, or any combination thereof.

At block 505, method 500 may include identifying a request to resolve a host name broadcasted over a computer network. In some cases, method 500 may include monitoring communications associated with one or more hostname resolution protocols. At block 510, method 500 may include identifying a response to the request over the computer network. In some cases, method 500 may include identifying a hostname specified in the response to the request. At block 515, method 500 may include analyzing a host name specified in the response in relation to a whitelist. In some cases, the whitelist may include a list of at least one process, at least one device, or any combination thereof permitted to specify in the response a non-matching hostname that differs from the actual hostname. At block 520, method 500 may include detecting a first process using a second process to send the response. At block 525, method 500 may include assigning a score to at least one of the first process and the second process based at least in part on analysis of the first process using the second process to send the response. In some cases, method 500 may include updating an existing score associated with at least one of the first process and the second process.

Figure 6:
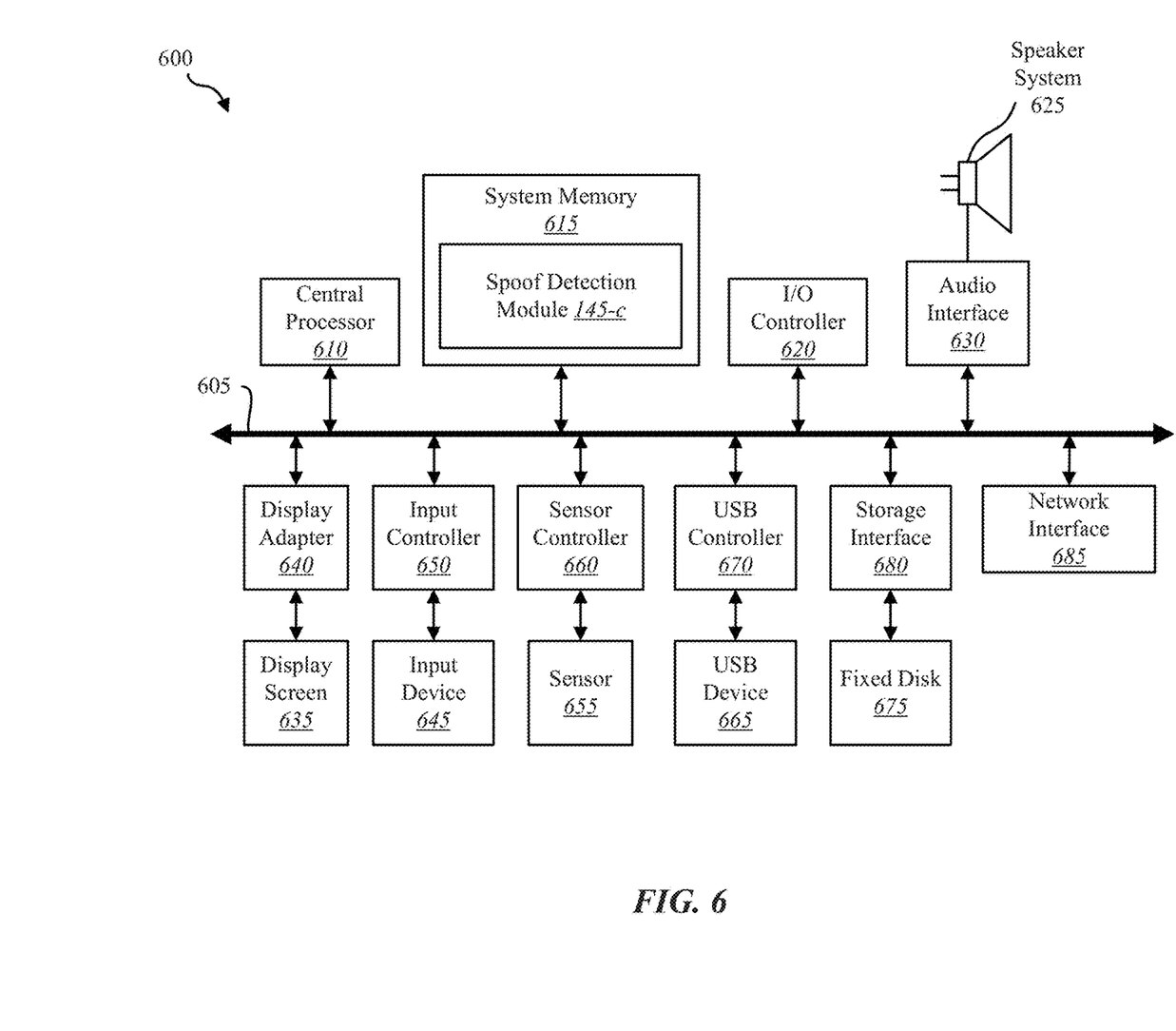
FIG. 6 depicts a block diagram of a computer system suitable for implementing the present systems and methods.

FIG. 6 depicts a block diagram of a computing device 600 suitable for implementing the present systems and methods. The device 600 may be an example of device 105, computing device 150, network device 125, and/or server 110 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the spoof detection module 145-c to implement the present systems and methods may be stored within the system memory 615. Applications (e.g., application 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 600 wirelessly via network interface 685.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 600 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 685 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 620 may operate in conjunction with network interface 685 and/or storage interface 680. The network interface 685 may enable system 600 with the ability to communicate with client devices (e.g., device 105 of FIG. 1), and/or other devices over the network 115 of FIG.

1. Network interface 685 may provide wired and/or wireless network connections. In some cases, network interface 685 may include an Ethernet adapter or Fibre Channel adapter. Storage interface 680 may enable system 600 to access one or more data storage devices. The one or more data storage devices may include two or more data tiers each. The storage interface 680 may include one or more of an Ethernet adapter, a Fibre Channel adapter, Fibre Channel Protocol (FCP) adapter, a SCSI adapter, and iSCSI protocol adapter.

Figure 7:
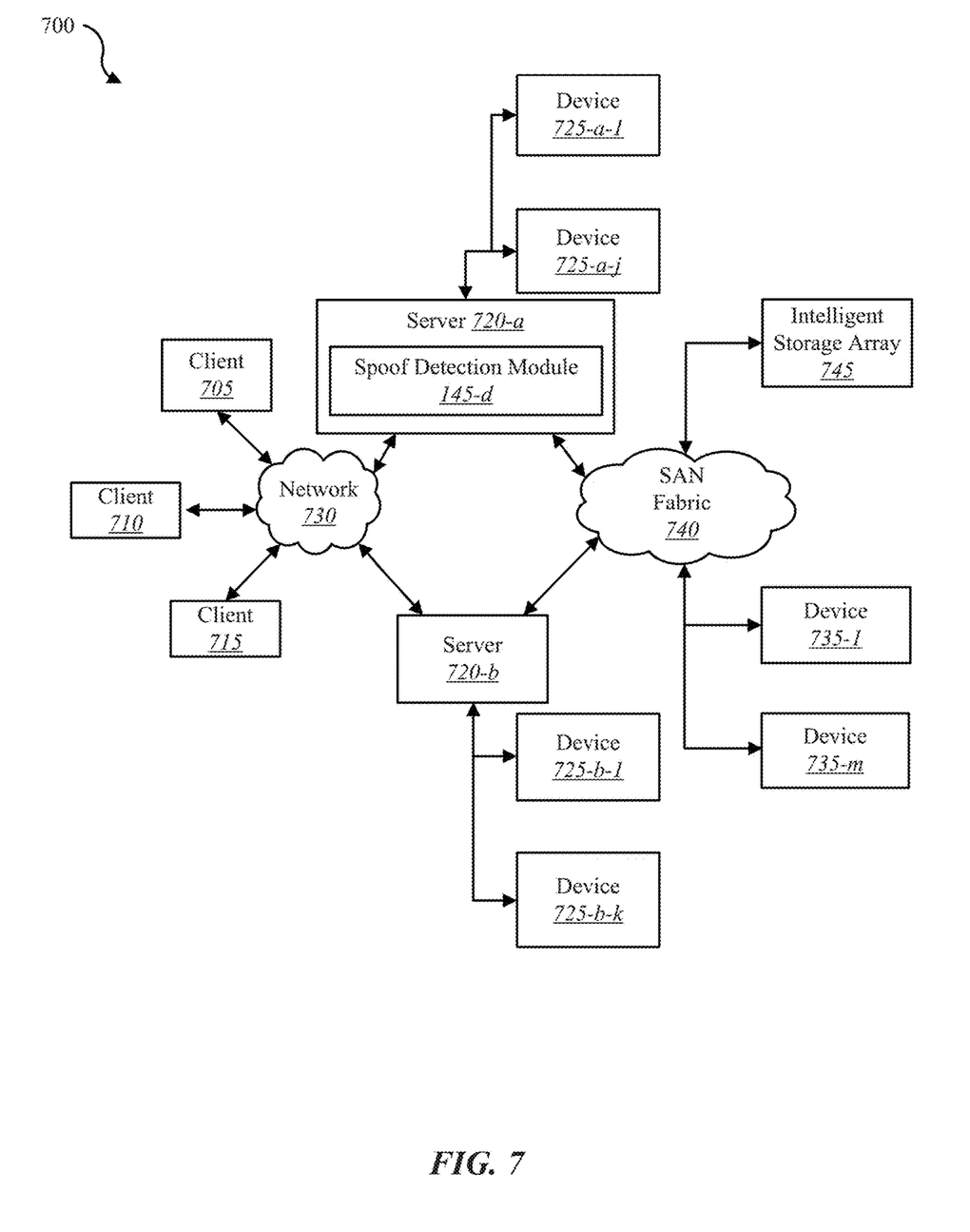
FIG. 7 depicts a block diagram of a computer system suitable for implementing the present systems and methods.

FIG. 7 is a block diagram depicting a network architecture 700 in which client systems 705, 710 and 715, as well as storage servers 720-*a* and 720-*b* (any of which can be implemented using computer system 600), are coupled to a network 730. In one embodiment, spoof detection module 145-*d* may be located within one of the storage servers 720-*a*, 720-*b* to implement the present systems and methods. Spoof detection module 145-*d* may be one example of spoof detection module 145 depicted in FIGS. 1, 2, 3, and/or 6. The storage server 720-*a* is further depicted as having storage devices 725-*a*-1 through 725-*a*-*j* directly attached, and storage server 720-*b* is depicted with storage devices 725-*b*-1 through 725-*b*-*k* directly attached. SAN fabric 740 supports access to storage devices 735-1 through 735-*m* by storage servers 720-*a* and 720-*b*, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-*a* or 720-*b* using, for example, a web browser or other client software (not shown). Such a client allows client systems 705, 710 and 715 to access data hosted by storage server 720-*a* or 720-*b* or one of storage devices 725-*a*-1 to 725-*a*-*j*, 725-*b*-1 to 725-*b*-*k*, 735-1 to 735-*m* or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for detecting name resolution spoofing, comprising:
   identifying a request to resolve a host name;
   identifying a hostname specified in a response to the request, wherein the response includes a device identifier;
   identifying an actual hostname associated with the response;
   comparing the actual hostname to the hostname specified;
   determining, based at least in part on the comparing, that the hostname specified does not match at least a portion of the actual host name;
   analyzing, based at least in part on the determining, the hostname specified and the actual hostname in relation to a whitelist, wherein the whitelist includes at least one device permitted to specify in the response a non-matching hostname that differs from the actual hostname;
analyzing the device identifier in relation to the whitelist;
determining the analysis indicates the whitelist does not permit the actual host name to use the hostname specified and the device identified by the device identifier is not included in the whitelist; and
performing a security action based at least in part on the analysis indicating the whitelist does not permit the actual host name to use the hostname specified.

2. The method of claim 1, identifying c request to resolve the host name comprising:
monitoring communications associated with a hostname resolution protocol, wherein a requesting device broadcasts the request over a computer network, and wherein a responding device sends the response to the requesting device over the computer network.

3. The method of claim 2, wherein the hostname resolution protocol includes at least one of a Link-Local Multicast Name Resolution (LLMNR) protocol and a Netbios Name Service (NBNS) protocol.

4. The method of claim 2, comprising:
monitoring processes on at least one of the responding device, the requesting device, and a third device associated with the computer network, or any combination thereof, to detect a first process using a second process to send the response.

5. The method of claim 1,
wherein the whitelist further includes a list of at least one process permitted to specify in the response a non-matching hostname that differs from the actual hostname.

6. The method of claim 5, wherein the whitelist includes file information associated with at least one process or device included in the whitelist, the file information including at least one of a file name, file size, file content, file path, file hash, signing information of a digitally signed file, or any combination thereof.

7. The method of claim 5, wherein the whitelist includes the non-matching hostname that differs from the actual hostname.

8. The method of claim 2, wherein the security action includes at least one of monitoring the responding device, blocking a message from the responding device, performing a malware scan on a process associated with the response, performing a malware scan on the responding device, quarantining the process associated with the response, disconnecting the responding device from the computer network, blocking the responding device from accessing the computer network, or any combination thereof.

9. The method of claim 2, wherein the security action includes at least one of generating a notification that includes at least one or any combination of an indication of a potential spoofed broadcast name query response, information retrieved from the response, information from the responding device, information from a result of the analysis, and sending the notification to a designated recipient.

10. The method of claim 1, wherein the computer network includes a subnetwork of a local area network.

11. A computing device configured for detecting name resolution spoofing, comprising:
one or more processors;
memory in electronic communication with the one or more processors, wherein the memory stores computer executable instructions that when executed by the one or more processors cause the one or more processors to perform the steps of:
identifying a request to resolve a host name;
identifying a hostname specified in a response to the request, wherein the response includes a device identifier;
identifying an actual hostname associated with the response;
comparing the actual hostname to the hostname specified;
determining, based at least in part on the comparing, that the hostname specified does not match at least a portion of the actual host name;
analyzing, based at least in part on the determining, the hostname specified and the actual hostname in relation to a whitelist, wherein the whitelist includes at least one device permitted to specify in the response a non-matching hostname that differs from the actual hostname;
analyzing the device identifier in relation to the whitelist;
determining the analysis indicates the whitelist does not permit the actual host name to use the hostname specified and the device identified by the device identifier is not included in the whitelist; and
performing a security action based at least in part on the analysis indicating the whitelist does not permit the actual host name to use the hostname specified.

12. The computing device of claim 11, wherein the instructions executed by the one or more processors cause the one or more processors to perform the steps of:
monitoring communications associated with a hostname resolution protocol, wherein a requesting device broadcasts the request over a computer network, and wherein a responding device sends the response to the requesting device over the computer network.

13. The computing device of claim 12, wherein the hostname resolution protocol includes at least one of a Link-Local Multicast Name Resolution (LLMNR) protocol and a Netbios Name Service (NBNS) protocol.

14. The computing device of claim 12, wherein the instructions executed by the one or more processors cause the one or more processors to perform the steps of:
monitoring processes on at least one of the responding device, the requesting device, and a third device associated with the computer network, or any combination thereof, to detect a first process using a second process to send the response.

15. The computing device of claim 11, wherein the instructions executed by the one or more processors cause the one or more processors to perform the steps of:
wherein the whitelist further includes a list of at least one process permitted to specify in the response a non-matching hostname that differs from the actual hostname.

16. The computing device of claim 15, wherein the whitelist includes file information associated with at least one process or device included in the whitelist, the file information including at least one of a file name, file size, file content, file path, file hash, signing information of a digitally signed file, or any combination thereof.

17. The computing device of claim 15, wherein the whitelist includes the non-matching hostname that differs from the actual hostname.

18. The computing device of claim 12, wherein the security action includes at least one of monitoring the responding device, blocking a message from the responding device, performing a malware scan on a process associated with the response, performing a malware scan on the responding device, quarantining the process associated with the response, disconnecting the responding device from the computer network, blocking the responding device from accessing the computer network, or any combination thereof.

19. A non-transitory computer-readable storage medium storing computer executable instructions that when executed by a processor cause the processor to perform the steps of:

identifying a request to resolve a host name;

identifying a hostname specified in a response to the request, wherein the response includes a device identifier;

identifying an actual hostname associated with the response;

comparing the actual hostname to the hostname specified;

determining, based at least in part on the comparing, that the hostname specified does not match at least a portion of the actual host name;

analyzing, based at least in part on the determining, the hostname specified and the actual hostname in relation to a whitelist, wherein the whitelist includes at least one device permitted to specify in the response a non-matching hostname that differs from the actual hostname;

analyzing the device identifier in relation to the whitelist;

determining the analysis indicates the whitelist does not permit the actual host name to use the hostname specified and the device identified by the device identifier is not included in the whitelist; and performing a security action based at least in part on the analysis indicating the whitelist does not permit the actual host name to use the hostname specified.

20. The computer-program product of claim 19, wherein the instructions executed by the one or more processors cause the one or more processors to perform the steps of: monitoring communications associated with a hostname resolution protocol, wherein a requesting device broadcasts the request over a computer network, and wherein a responding device sends the response to the requesting device over the computer network.

* * * * *